March 4, 1941.  F. H. SCHOENFELD  2,233,679
THERMOSTAT VALVE MECHANISM
Filed May 6, 1938  2 Sheets-Sheet 1
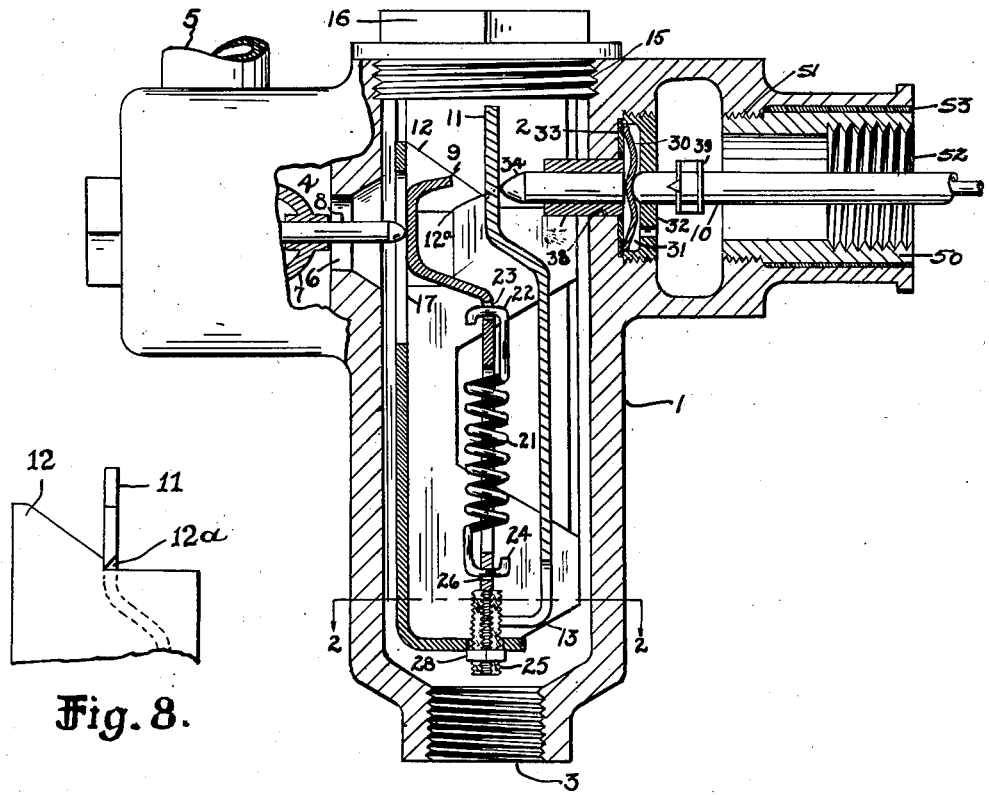
Fig. 1.
Fig. 8.
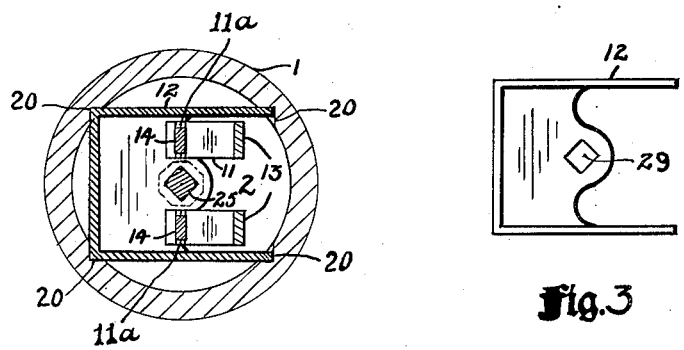
Fig. 2.  Fig. 3.
INVENTOR.
FRANK H. SCHOENFELD
BY
his ATTORNEY.

March 4, 1941.  F. H. SCHOENFELD  2,233,679

THERMOSTAT VALVE MECHANISM

Filed May 6, 1938  2 Sheets-Sheet 2

INVENTOR.
FRANK H. SCHOENFELD
BY
*his* ATTORNEY.

Patented Mar. 4, 1941

2,233,679

UNITED STATES PATENT OFFICE 2,233,679

THERMOSTAT VALVE MECHANISM

Frank H. Schoenfeld, Cleveland Heights, Ohio

Application May 6, 1938, Serial No. 206,413

1 Claim. (Cl. 236—48)

This invention relates to a thermostatic valve mechanism and particularly to a modification and improvement of the type of thermostatic valve mechanism as disclosed in my United States Letters Patent Nos. 2,063,465, issued December 8, 1936, and 2,102,752, issued December 21, 1937.

In a thermally operated valve mechanism, such as used on domestic appliances, an increment temperature control device associated directly with a thermal bar is usually provided for changing the temperature limits at which the mechanism operates to open and close a valve in a fuel passage. But this increment temperature control is operative for changing the temperature limits only within an established or fixed range or spread of temperature degree difference, generally termed the temperature range of the valve mechanism. To change the range of this type of valve mechanism requires a substitution of parts in the mechanism or a replacement with a mechanism having a fixed range which is the range desired. In large industrial fuel gas consuming installations and also in the use of the large capacity appliances as hot water heaters for hotels, etc., it is very desirable to have a thermal mechanism which can be adjusted as to the temperature range within which the increment control operates.

Furthermore, experience has proven in the installation of domestic appliances that the temperature range of the mechanism becomes altered in many instances before it is finally installed for use in connection with an appliance. This alteration frequently requires a replacement of the thermal valve mechanism because adjustments cannot satisfactorily be made without interfering with the entire operation of the mechanism.

Also in this general type of thermal mechanism used, the thermal bar which acts as the temperature controlling mechanism must contact or engage in some manner a valve actuating mechanism which is placed adjacent to or in connection with a valve controlling the supply of fuel through a passage. An opening into the fuel passage is usually provided for the thermal bar and this requires a complete and positive seal for the opening for purposes of safety and elimination of fuel loss. Heretofore the seals have been made by a connection onto the bar itself, but this arrangement is not satisfactory because it interferes to some extent with the functioning of the mechanism and also because of the uncertainty of maintaining a positive seal during movement of the bar.

It is a principal object of this invention to provide a thermostatic valve actuating mechanism of the type controlling the flow of fuel through a passage which is arranged for increment control within a fixed range with a means for adjusting the temperature limits or range of temperature itself throughout which the increment control may operate and to provide further means associated with the thermal element for effectively sealing this opening for the thermal element to prevent any leakage of fuel therepast.

The thermal mechanism described in my aforesaid patents is adjustable for temperature range and it operates on the principle of varying the position of the valve actuating lever mechanism relative to a thermal bar so that by changing the position of the mechanism, more or less movement is necessary of the bar for opening and closing the valve. In my Patent No. 2,102,752, the degree range is varied in a similar manner by the provision of a plurality of pivot seats or fulcrum points for a carrier frame which supports the lever actuating mechanism thereby changing the position of the bar relative to the mechanism.

It is another and equally important object of this invention to provide an adjustable means in connection with my thermostatic valve mechanism, as described in the aforesaid patents, or a mechanism of the same general character for changing the range or degree spread throughout which the thermal bar is operative for controlling fuel through a passage and while the valve mechanism is connected to or in operative condition with an appliance to be controlled.

It is a more specific object of this invention to provide such an adjustable means whereby a wide latitude or range of degree operating limits of the thermal bar can be made.

It is a further and more specific object of this invention to provide a means for facilitating the assembly of my mechanism as described in the aforesaid patents.

It is an equally important object of this invention to provide in a thermally controlled valve mechanism a means for effectively sealing the opening connecting to the fuel passage through which the thermal bar operates in controlling a valve in a fuel passage.

It is a more specific object of this invention to provide a sealing means in the opening through which the thermal element operates which does not hinder or obstruct the operation or movement of the thermal element in actuating the valve operating mechanism.

Other objects of this invention will become apparent from the following specification, reference being had to the accompanying drawings, in which:

Figure 1 is a sectional view of an embodiment of my invention illustrating in an open position the valve which controls the flow of fuel through the passage;

Fig. 2 is a transverse sectional view along the line 2—2 of Fig. 1, illustrating the carrier frame which supports the lever actuating mechanism and a probable position of these levers when the valve is in an open position;

Fig. 3 is a plan view of the frame carrier;

Fig. 8 is a detailed fragmentary view showing an illustrative form of pivot connection between two of the parts of the construction (a power lever and its frame).

Figure 4:
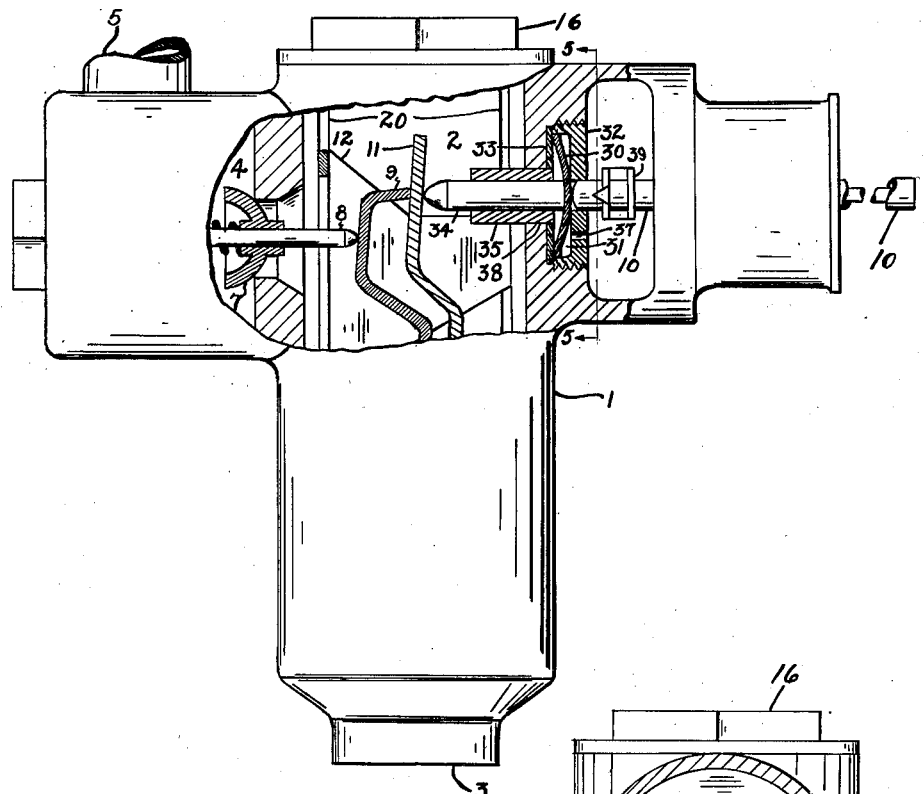
Fig. 4 is a sectional view of the same embodiment as illustrated in Fig. 1 and showing the valve in a closed position.
Figure 5:
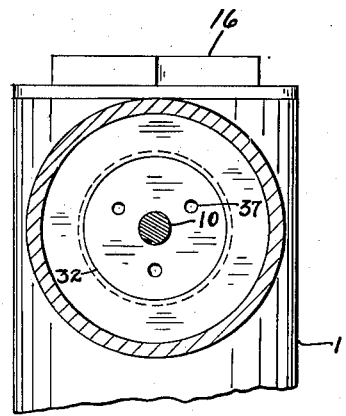
Fig. 5 is a sectional view taken along the line 5—5 of Fig. 4.

Referring to the drawings, the embodiment is illustrated in connection with my thermal valve mechanism described and claimed in my previously mentioned patents of which a very brief description will hereinafter be made. A body 1 has a main chamber 2 connected to an outlet passage 3 and an auxiliary chamber 4 connected to an inlet passage 5. The passage 6 connecting the chambers 2 and 4 is controlled by a valve 7 having a striking pin 8 which contacts a secondary lever 9 of the valve actuating mechanism. A main or power lever 11 is pivoted at 12a on a frame carrier 12 which is fitted into the body by means of broached seats 20; see Fig. 2. The pivot shown in Fig. 8 is of the knife edge type, the knife edge being on the lever 11 and the supporting notch therefor on the frame 12 as illustrated. The carrier frame 12 is inserted into the chamber 2 through the opening 15 in the body which is closed by a cap 16. The bifurcated end 14 of the secondary lever 9 is pivoted on the bifurcated end 13 of the main or power lever 11. The carrier frame 12 has an opening 17 through which the striking pin 8 of the valve 7 passes and engages a surface of the secondary lever 9.

For holding the secondary lever 9 onto the main lever 11, a spring 21 has an end 22 which is connected to the secondary lever through an opening 23, and the other end 24 of the spring is connected to an adjustable means associated with the frame carrier.

In the form shown herein for purposes of illustration, this adjustable means is a stud 25 which passes through an opening 29 in the frame carrier 12 and has an opening 26 for the end 24 of the spring 21. This stud 25 is preferably of the shape illustrated, which is a square stud having threads cut into the corners of the surface and is preferably of less cross section than the opening 29 in the frame carrier so as not to be in threaded engagement with the frame carrier 12. This arrangement permits an adjustment or increase in tension of the spring 21 without causing any twisting or change in position of the spring relative to the secondary lever 9. This adjustment is obtained by movement of a nut 28, which engages a surface of the frame carrier 12 and thus draws the stud through the opening 29, and in turn draws the end 24 of the spring toward the carrier 12. The purpose of this adjustment will be described later.

An opening 38 in the body 1 is provided in this general type of mechanism through which the thermal bar operates to actuate the valve, and for preventing any leakage of fuel through this opening a novel sealing means is provided. The thermal bar 10, which generally is arranged to directly contact or engage the power or main lever 11, engages a resilient disc 30 in the opening 38 and which is of such a character as to be responsive to movement of the bar 10. This disc 30 is supported in the opening by fitting into a cavity or opening in a sealing nut 32 which is threaded to a surface of the body 1 defining the opening 38 and forming a fuel tight joint as by engaging a lead gasket 33. A steel pin 34 is interposed between the responsive disc 30 and the main lever 11 for transferring the action of the disc to the main lever 11 and it is supported by a guide bushing 35 fitted into the body. For inserting the sealing nut into the body 1, holes are provided as shown at 37, for use in connection with a spanner wrench. As the thermal bar 10 moves to the left from its position illustrated in Fig. 4, it causes a distortion of the concave surface 40 of the disc 30 which in turn causes a movement of the steel pin 34 and the main or power lever 11, causing the power lever 11 to move from a position as illustrated in Fig. 4 to a position as illustrated in Fig. 1 and thus opening the valve 7 in the passage 6.

Figure 6:
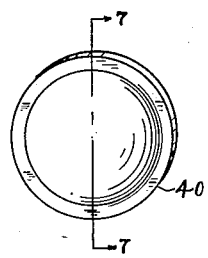
Fig. 6 is a perspective view of a disc used in connection with my sealing means as illustrated in Figs. 1 and 4.
Figure 7:
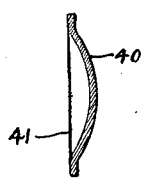
Fig. 7 is a sectional view of the same disc along the line 7—7 of Fig. 6.

The disc 30 is made preferably of a steel having a sufficient thinness and of a material such that it is capable of deformation without resulting in a deformation of a more or less permanent character, and upon the release of the pressure exerted by movement of the thermal bar, the deformed portion of the disc, due to the resiliency, returns to its normal position. Figs. 6 and 7 are more or less of an exaggerated illustration of the disc 30. To insure this restoring action of the disc, it is preferred that the extent of deformation of the concave portion 40 does not exceed or pass beyond the plane coincident with the supporting surface of the disc; that is, the total movement of the bar 10 to the left is such that the central portion of the disc cannot be sprung past the plane represented by the supporting surface 41. By this novel sealing means, the opening 38 through which the thermal bar ordinarily passes is completely sealed, and this means does not hinder or obstruct the action of the thermal bar 10 in actuating the valve, since the seal is not formed with the thermal bar 10 but it is separate and apart from the bar. And the means does not hinder or obstruct the action of the snap action mechanism in returning the valve to a normally closed position because of the resilient character of the disc 30.

The increment control 39, as shown in Figures 1 and 4, is on most valve mechanisms of this type but its use is limited for adjusting the operation of the mechanism within the fixed range and when used in connection with the present invention its limits of operation are determined by the adjustment made to the range control associated with the lever actuating mechanism.

Referring to the adjustable means associated with the toggle or dead center spring 21 of my lever actuating mechanism, a stud 25 is connected to one end of the spring and is supported by the frame carrier 12, and by movement of the stud 25, the tension in the spring can be varied. I have found that by increasing the tension in the spring 21, the range or degree spread of operation of the mechanism is increased, and, conversely, by decreasing the tension, the range or degree spread of the mechanism is decreased. The range having been set, these increment adjustments can be made by the use of the increment control 39.

Although the adjustable range control is described in connection with the lever actuating mechanism described in my aforesaid patents, it is obvious that this means can be suitably accommodated for use on the many arrangements of spring-actuated lever mechanism.

In the operation of the complete mechanism, it is assumed for descriptive purpose that the valve is in the closed position, as illustrated in Fig. 4, and the bar 10 is cooling so that the left end is moving to the left. Continued movement of the bar 10 to the left causes a deformation of the concave portion 40 of the disc 30 to a degree as illustrated in Fig. 1. By this movement of the bar 10 and consequent deformation of the disc 30, the steel pin 34 is moved in a direction toward the power lever 11, and, due to its engagement with a surface of this lever, the lever 11 is moved from a position indicated in Fig. 4, to a position indicated in Fig. 1, thereby moving the valve 7 by the supplemental action of the lever and spring mechanism, thus showing the transfer of movement of the bar 10 to the valve 7.

The fuel passing through the passage 6 into the chamber 2 and thence to the outlet 3 by the opening of the valve 7, is prevented from filtering or leaking to the atmosphere through the opening 38 because of the means associated with the disc 30 which forms a complete and positive seal of the opening 38 and it in no manner depends upon any joint being formed with a surface of the thermal bar 10. In other words, the joint can be so formed that a positive seal is provided without interfering with the movement of the thermal bar during heat application, so that the inner end of the bar 10 can move any required distance to the right without affecting the disc once the disc assumes its normal or fully bulged position.

Should it be desired that the range or degree spread be increased over that which is now assumed to be the operating range of the bar 10, the range or degree spread in operation can be increased or decreased by increasing or decreasing the tension in spring 21 by movement of the stud 25. As an example, assuming the operating range is 50°, if it is desired that this range be increased to 75°, this increase in range can be made by increasing the tension in the spring 21, as previously described. Should it be desired to decrease the range, that is, reduce the range of 50° to a range of 30°, then the tension in the spring is reduced as heretofore described. Having established a range, the increment control 39 can then be used for varying the operation within the established range.

Instances where the range of thermal mechanism becomes altered during shipment or assembly, the desired range can be again established by making the proper adjustment to the range control. In many instances, this has required a replacement of mechanism heretofore used but by this invention it is possible, and the invention was so designed to provide a way for making such adjustments when the mechanism is in assembled condition and thus eliminate the necessity for replacement.

Also this adjustable device is very useful in the assembly of the lever mechanism of the nature heretofore described, especially in the assembly of the larger size of mechanism.

It is observed that modifications can be made of the embodiment of my invention, that is, of the adjustable means and seal, as illustrated in Fig. 1, and this illustration and detailed description is not intended to be a limitation of this invention. The embodiment of my invention, as illustrated, is adapted for use in connection with my thermal mechanism, as described in the aforesaid patents, but it is not intended that this be considered as a limitation in its use.

Having thus described my invention, I claim:

A thermostatic control mechanism for operating a valve within a predetermined range of temperature control including a body having a fuel passage therethrough and an opening connecting with the passage, a valve in said passage, a thermal means operable through said opening for actuating the valve upon movement of the thermal means, a valve actuating means interposed between said thermal means and said valve and comprising a main lever actuated by said thermal means, a secondary lever supported by said main lever and engageable with said valve, a spring connected to said secondary lever and to the body for effecting snap action of the actuating means to final positions after initial operations by the thermal means, and an adjustable means interposed in the connection of the spring to the body and supported by the body to compensate for variance in the elements included in the valve actuating means and in the assembly thereof and to vary the tension in the spring without changing materially the final positions of the actuating means relative to the spring and thereby effecting a change in the operating relation of the thermal means with respect to the valve.

FRANK H. SCHOENFELD.